United States Patent [19]

Houston

[11] 4,090,241
[45] May 16, 1978

[54] METHOD FOR ESTIMATING AND CONTROLLING THE MASS FLOW RATE OF A FREE FALLING FLUID STREAM

[75] Inventor: Robert L. Houston, Heath, Ohio

[73] Assignee: Owens-Corning Fiberglas Corporation, Toledo, Ohio

[21] Appl. No.: 640,357

[22] Filed: Dec. 15, 1975

[51] Int. Cl.² .............................................. G06F 15/46
[52] U.S. Cl. ...................................... 364/473; 65/326; 73/194 E; 73/194 M; 364/510; 364/556
[58] Field of Search ........................ 235/151.1, 151.34; 73/3, 194 R, 194 E, 194 M, 196, 205 D; 65/326, 327

[56] References Cited

U.S. PATENT DOCUMENTS

| | | | |
|---|---|---|---|
| 3,244,495 | 4/1966 | Apple et al. ........................ | 65/327 X |
| 3,315,524 | 4/1967 | Duffy et al. ........................ | 73/194 M |
| 3,580,976 | 5/1971 | DeBussy ............................. | 65/326 X |
| 3,600,149 | 8/1971 | Chen et al. ...................... | 235/151.1 X |
| 3,715,919 | 2/1973 | Kishimoto et al. ................ | 73/194 E |

*Primary Examiner*—Jerry Smith
*Attorney, Agent, or Firm*—Ronald C. Hudgens; Philip R. Cloutier; Ted C. Gillespie

[57] ABSTRACT

A mathematical model for estimating the mass flow rate of a fluid stream free falling from an overhead orifice by measuring the stream's diameter is presented. The model is particularly applicable for determining the mass flow rate of a free falling stream of molten glass typically supplying a glass wool centrifuge commonly used in the manufacture of glass fiber insulation. A method for automatic control of the molten glass flow to a typical glass forming operation based upon the model is also presented.

15 Claims, 8 Drawing Figures

METHOD FOR ESTIMATING AND CONTROLLING THE MASS FLOW RATE OF A FREE FALLING FLUID STREAM

BACKGROUND OF THE INVENTION

The present invention relates to a method of estimating the mass flow of a free falling stream of fluid, such as molten glass, without physical interruption or interference of the stream flow.

In a typical manufacturing process for the production of glass wool, molten glass is fed through electrical resistance heated platinum orifices or bushings approximately ¾ to 1¼ inches in diameter and permitted to free-fall therefrom into a glass wool fiberizer. The bushings, one per fiberizer, are generally located in a line and at regular intervals along the floor of a forehearth supply channel. Mass flow rate of molten glass through the bushing, and ultimately through its corresponding fiberizer, is typically controlled by varying the bushing temperature thereby affecting the viscous drag acting upon the glass as is passes through the bushing.

In order to maintain the proper product quality it is necessary to maintain a given mass flow rate of molten glass to the fiberizer. Such control is particularly important where a multiple number of tandemly arranged fiberizers cooperate to form the final product as is typical in the manufacture of glass fiber insulating wool.

Heretofore, the mass flow rate or through put of a typical glass forming operation has been estimated by the "catch bucket" method. By this method the stream of molten glass flowing from the overhead bushing to the fiberizer below is temporarily interrupted by inserting a catch bucket into the stream and catching a timed portion of molten glass. The portion is then weighed and the mass flow rate calculated. Manual adjustment of the bushing temperature is then made to correct the mass flow rate.

Although the "catch bucket" method of through put measurement has sufficed in the past it has several disadvantages. The "catch bucket" method requires sampling the glass stream by interrupting its flow and the production of the forming apparatus supplied by that stream. Further, since the mass flow of a given falling stream of molten glass varies as the temperature of the glass within that stream, which may in turn vary because of variable forehearth conditions, the "catch bucket" method provides data accurate only for the time of sampling. Hence, the "catch bucket" method of molten glass measurement provides only representative data. Such representative data is not suitable for closed loop automated control of the process.

BRIEF SUMMARY OF THE INVENTION

Although the specific embodiment of my invention taught herein employs molten glass as the fluid it is to be understood that the principles of my invention may be applied to fluids other than molten glass so long as the assumptions made herein are applicable.

By my invention the mass flow rate of a molten stream of glass, or any other fluid stream, free-falling from an overhead orifice may be measured without physical interruption or interference of the steam. A mathematical model is developed that successfully predicts the molten glass flow rate requiring two glass stream diameter measurements and the fluid stream viscosity. However, the model requires measuring two separate stream diameters at a known axial distance apart and an estimate of the effective average fluid viscosity at the location of diameter measurement. However when applied to a molten glass stream it has been discovered that the unknown and relatively unmeasurable molten glass viscosity required by the model may be approximated by an upstream viscosity value determined by measuring the upstream molten glass temperature.

The temperature of a free-falling stream of molten glass has been found to exhibit a direct relationship with the molten glass temperature upstream of the bushing. For example, in a typical glass wool process a 10° F increase in the upstream molten glass temperature may be expected to result in a 10° F increase at the stream diameter measurement location. Thus, after suitable calibration of the model the upstream location may be used to "track" or follow the temperature (viscosity) changes in the glass stream itself.

Once calibrated, the model may be programmed into a closed control loop to monitor and adjust the mass flow rate of molten glass to a glass forming operation.

DESCRIPTION OF THE INVENTION

Overview Of The Embodying Process

Figure 1:
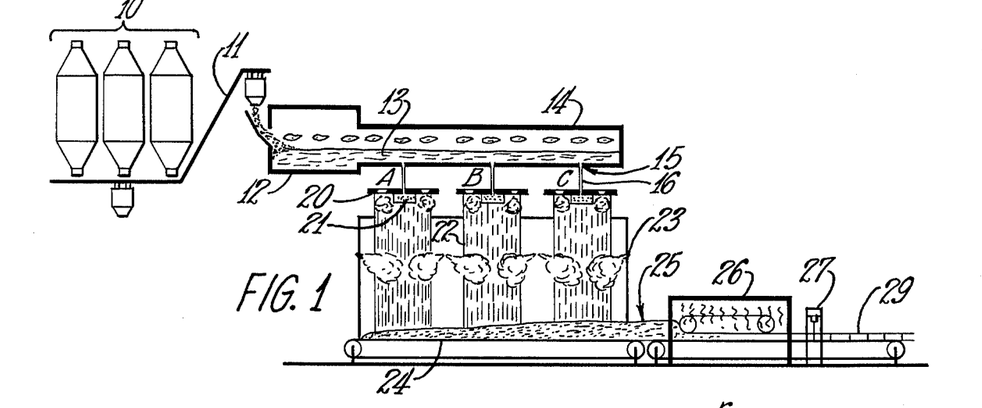
FIG. 1. shows an elevational schematic of a typical glass wool production process.

FIG. 1 shows a typical glass fiber production process for the manufacture of glass wool insulating material wherein my invention may be advantageously employed. Raw materials are formulated and stored in bins 10. The formulated raw materials or batch is conveyed from storage bins 10 by any suitable means 11 to the melting furnace 12 and charged therein at a rate sufficient to maintain the mass flow rate of molten glass 13 being extracted and flowed through the supply forehearth 14 to forming positions A, B, and C. Positioned in the floor of the supply forehearth 14 for each forming position A, B and C is an electrical resistance heated platinum nozzle or bushing 15 through which the molten glass 13 free falls as a molten stream 16 to the fiberizing apparatus 20 below. The mass flow rate of molten glass through the bushing 15 is typically controlled by varying the bushing temperature which will be further explained below.

The molten stream 16 is typically received by a centrifuge device 21 which projects radial streams of molten glass into a transverse annular gaseous blast typically directed downward toward a horizontally moving collecting belt or forming chain 24. The annular gaseous blast attenuates the radial molten streams of glass emanating from the centrifuge 21 into a hollow cylindrical veil 22 flowing toward and depositing the attenuated fibers upon the forming chain 24. During the flight of the fiber veil 22 toward the forming chain 24 it is common to treat the flowing fibers with a binding material by spraying such material upon the moving fiber veil from spray nozzles 23. As the fiber veils 22 are deposited upon the translating forming chain 24 an uncured glass wool pack 25 is built thereupon comprising glass fibers coated with a binding material. Wool pack 25 is then passed through a tyical thermal oven 26 wherein the binder is thermally cured. The final glass fiber wool pack is then typically chopped into batts 29 of desirable length by a suitable chopper 27 and packaged by suitable packaging apparatus not shown.

Within the above described glass fiber forming process my invention specifically relates to the free falling stream of molten glass 16 flowing from the resistance heated bushing 15 to the fiberizing apparatus 20.

The mass flow rate of molten glass through the bushing 15 is affected principally by the average viscosity of the molten glass, the head of glass above the bushing, the size of the bushing opening, and the specific viscosity of the molten glass layer immediately adjacent the bushing wall. The average molten glass viscosity is in turn affected by two main variables: (1) the chemical composition of the glass, and (2) the temperature of the glass as it enters the bushing. The viscosity of the glass layer immediately adjacent to the bushing wall is influenced strongly by the temperature of the bushing wall. Glass is a Newtonian fluid and its viscosity is quite sensitive to temperature, being on the order of a 1% change in viscosity for a 1–2% change of temperature. Therefore, the temperature of the bushing's wall greatly influences the viscosity of a relatively small layer of glass immediately adjacent the wall. This in turn influences the velocity gradient at the bushing wall and hence the mass flow rate of the stream as a whole.

Figure 2:
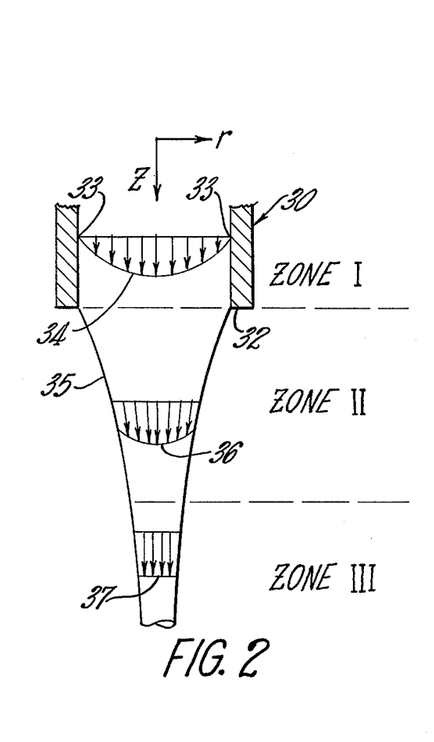
FIG. 2 shows the stream velocity profile transitioning from two-dimensional flow in the bushing to one dimensional flow in the stream.
Figure 3:
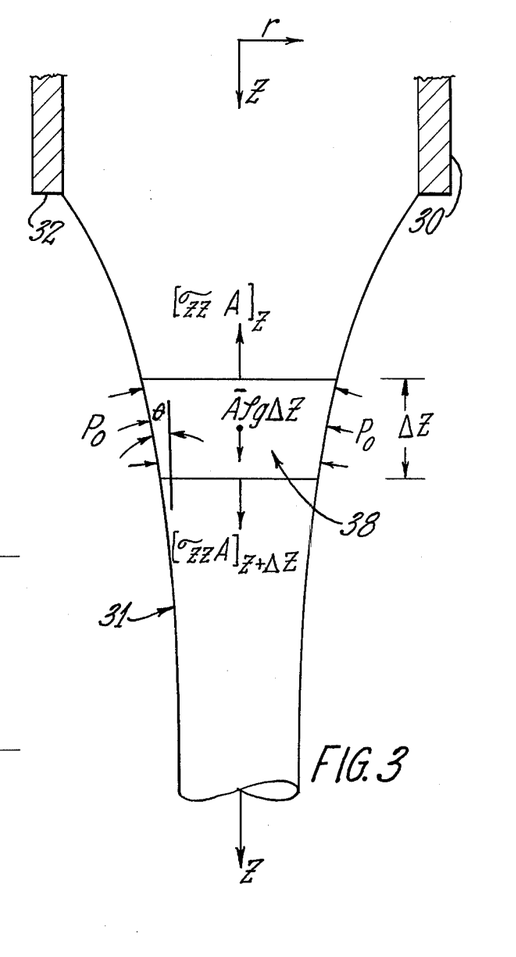
FIG. 3 shows a free body diagram of a stream fluid element.

FIGS. 2 and 3 schematically presents a cross-sectional view of molten glass flowing through bushing 30 and emanating therefrom as a free falling stream of molten glass 31. Typical velocity profiles are shown for three zones: zone I, inside the bushing; zone II just beyond the bushing exit tip 32; and zone III, several nozzle diameters below the bushing exit tip 32. The flow in zone I is laminar having finite shear or viscous drag present at the molten glass - bushing wall interface 33 resulting in the velocity profile 34. Below the bushing tip 32 fluid shear or aerodynamic drag at the molten glass - atmospheric interface 35 is negligible, thus permitting the velocity profile 36 to change from profile 34 to the uniform one-dimensional profile 37 of zone III. The velocity component $V_z$ of zone III, is assumed to depend only upon the axial coordinate $z$, or stated mathematically $V_z(z)$. It is assumed that any radial velocity component $V_r$ is much less than $V_z$ or $V_r \ll V_z$. It has been determined that the zone III flow conditions substantially exist approximately two nozzle diameters downstream of the exit tip 32 for molten glass.

The flow in zone III is characterized as having an axial velocity, $V_z$, depending upon $z$ alone. In addition, there is believed to be a radial velocity component, $V_r$, which is a function of radial as well as axial distance. However, $V_r$ is considered sufficiently small in zone III that the significant flow variables can be assumed functions of $z$ alone; that is, the significant flow variables are regarded as "one-dimensional." Mathematical Symbols In further describing my invention the following mathematical symbols are used.

A — Area of the stream cross-section
$b$ — Constant, equation (21)
$C_1$ — Constant, equation (22a)
$C_2$ — Constant, equation (22)
$d$ — Glass stream diameter,
$g$ — Acceleration due to gravity
K — Calibration constant
$m_f$ — Stream mass flow rate
$(m_f)_{actual}$ — Actual Stream mass flow rate
$(m_f)_{model}$ — Calculated mass flow rate
$(m_f)_{catch\ bucket}$ — Glass mass flow rate as determined manually,
P — Pressure
$P_o$ — Atmospheric Pressure
$r$ — Radial distance,
$s$ — Slope of the line given by equation (29)
$S_1$ — Slope of the line given by equation (21)
$V_r$ — Radial component of the stream velocity
$V_z$ — Axial stream velocity
$dV_z/dz$ — Axial velocity gradient
W — Dimensionless axial stream velocity, defined by equation (13) or (17)
$z$ — Distance along the axis of the stream
$\Delta z$ — Distance along the axis of the stream
$(\Delta z)_{max}$ — Maximum distance between the diameter measurements, defined by equation (28)
$\mu$ — Dynamic viscosity
$\xi$ — Dimensionless axial distance, defined by equation (14)
$\rho$ — Density of molten glass
$\sigma_{zz}$ — Normal stress in the $z$ direction
$\sigma_{rr}$ — Normal stress in the radial direction Subscripts (variables only),
0, 1, 2 — Stations on the axis of the glass stream at fixed elevations The Governing Differential Equation Assuming axisymmetric, incompressible steady flow, $V_z = V_z(Z)$, and ignoring all shear stresses, surface tension and aerodynamic drag affects, the forces acting upon a finite element of the molten glass stream are presented in FIG. 3. A is the stream's circular cross-sectional area, $\tau$ is density, $\sigma_{zz}$ is normal stress, and P, is the ambient atmospheric pressure acting upon the free surface of the stream. Thus, the axial momentum equation becomes:

$$M_f[V_z](Z) - M_f[V_z](Z+\Delta Z) + (\rho A \Delta Z)g - [\sigma_{zz} A](Z) + [\sigma_{zz} A](Z+\Delta Z) - P_o[[A](Z) - [A](Z+\Delta Z)] = 0 \quad (1)$$

where the overbar denotes an appropriate average value and $M_f$ is the molten glass mass flow rate. Dividing by $\Delta Z$ and rearranging terms gives:

$$\frac{M_f[V_z](Z+\Delta Z) - M_f[V_z](Z)}{\Delta Z} = \quad (2)$$

$$\frac{[\sigma_{zz} A](Z+\Delta Z) - [\sigma_{zz} A](Z)}{\Delta Z} +$$

$$\frac{P_o[A](Z+\Delta Z) - P_o[A](Z)}{\Delta Z} + \rho \overline{A} g$$

In the limit as $\Delta Z \to 0$:

$$M_f \frac{dV_z}{dZ} = \frac{d[\sigma_{zz}A]}{dZ} + P_o \frac{dA}{dZ} + (\rho A)g \tag{3}$$

And upon collecting terms:

$$M_f \frac{dV_z}{dZ} = \frac{d[(\sigma_{zz} + P_o)A]}{dZ} + (\rho A)g \tag{4}$$

The term $\sigma_{zz}$ in momentum equation (4) represents the stress normal to the circular cross-sectional area of finite element 38 in FIG. 3. Expressed in cylindrical coordinates it has the form:

$$\sigma_{zz} = -P + 2\mu(dV_z/dz) \tag{5}$$

The pressure P is found by solving the continuity equation
for the radial velocity component, $V_r$:

$$V_r = -(r/2)(dV_z/dz) \tag{6}$$

and substituting (6) into the radical stress equation:

$$\sigma_{rr} = -P + 2\mu(\delta V_r/\delta r) \tag{7}$$

Equation (5) then becomes:

$$\sigma_{zz} = \sigma_{rr} + 3\mu(dV_z/dz) \tag{8}$$

Assuming $\theta$ of FIG. 3 to be small as in zone III of FIG. 2, and assuming the radial bulk flow of momentum and shearing stresses to be insignificant the radial momentum balance may be stated as:

$$-P_o \sim \sigma_{rr}\big|_{r_o} \tag{9}$$

Assuming $P=P(z)$, equation (9) substituted into equation (8) gives the normal stress $\sigma_{zz}$ as:

$$\sigma_{zz} = -P_o + 3\mu(dV_z/dz) \tag{10}$$

Substituting $\sigma_{zz}$ of equation (10), and $$A = (M_f/\rho V_z) \tag{11}$$

rearranging and dividing out the term $M_f$, equation (4) yields:

$$\rho V_z \frac{dV_z}{dZ} = 3\mu V_z \frac{d}{dZ}\left(\frac{1}{V_z}\frac{dV_z}{dZ}\right) + \rho g \tag{12}$$

Equation (12) may be made dimensionless by defining, $$W = \left(\frac{\rho}{3\mu g}\right)^{\frac{1}{2}} V_z \tag{13}$$

$$\xi = \left(\frac{\rho}{3\mu}\right)^{\frac{1}{2}} g^{\frac{1}{2}} Z \tag{14}$$

Thus, equation (12) may be written as:

$$W\frac{dW}{d\xi} = W\frac{d}{d\xi}\left(\frac{1}{W}\frac{dW}{d\xi}\right) + 1 \tag{15}$$

Expressing equation (15) with primes denoting differentiation with respect to $\xi$ we have:

$$W'' = (W')^2/W + WW' - 1 \tag{16}$$

Equation (16) however, is a function of $V_z$ as seen by equation (13). By defining A of equation (11) as a function of the diameter $d$, solving for $V_z$ and substituting, equation (13) becomes:

$$W = \left(\frac{\rho}{3\mu g}\right)^{\frac{1}{2}} \frac{4M_f}{\pi d^2 \rho} \tag{17}$$

Consequently, the dependent variable W may be expressed in terms of $V_z$ by equation (13) or in terms of $d$ by equation (17).

Figure 4:
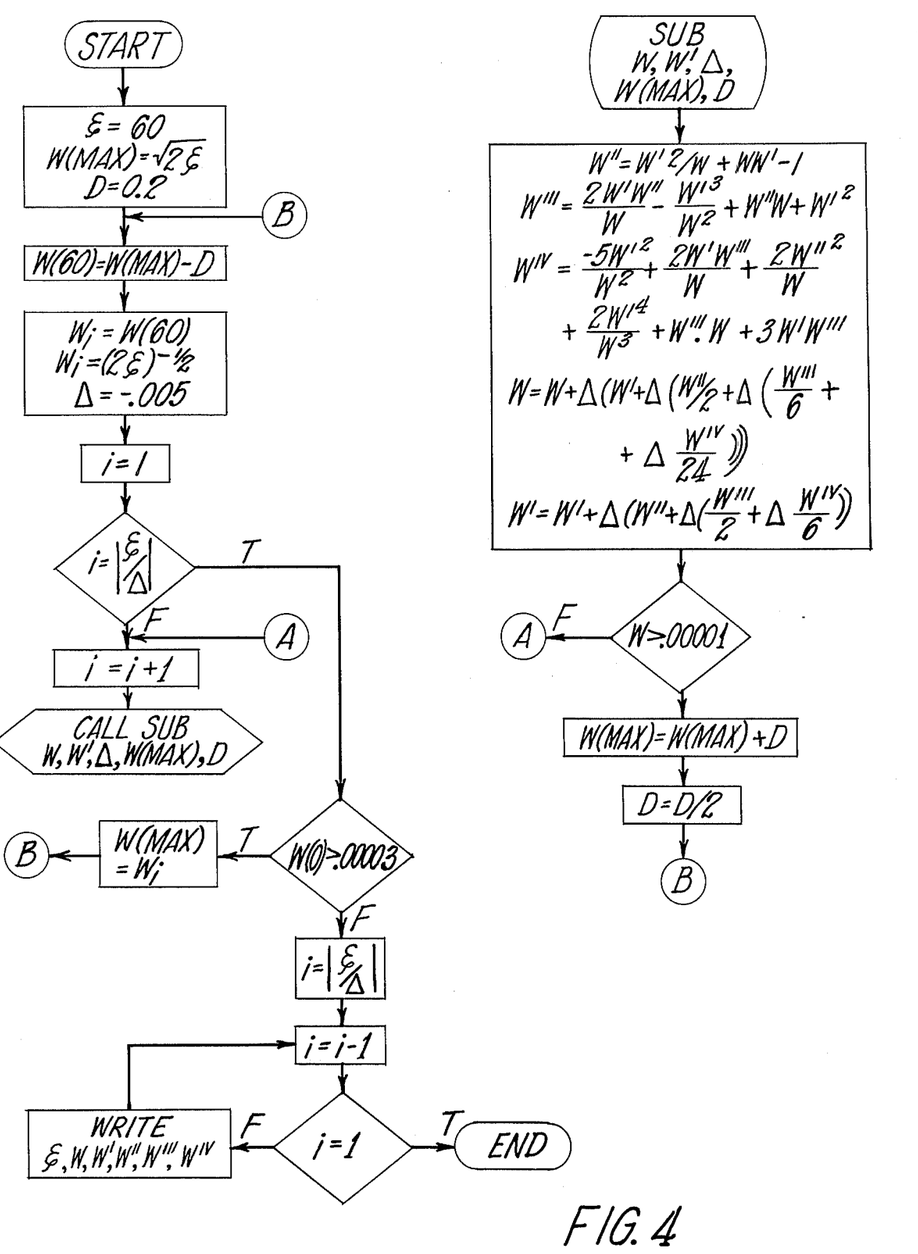
FIG. 4 presents a flow diagram of the computer program steps for numerically solving the momentum equation.
Figure 5:
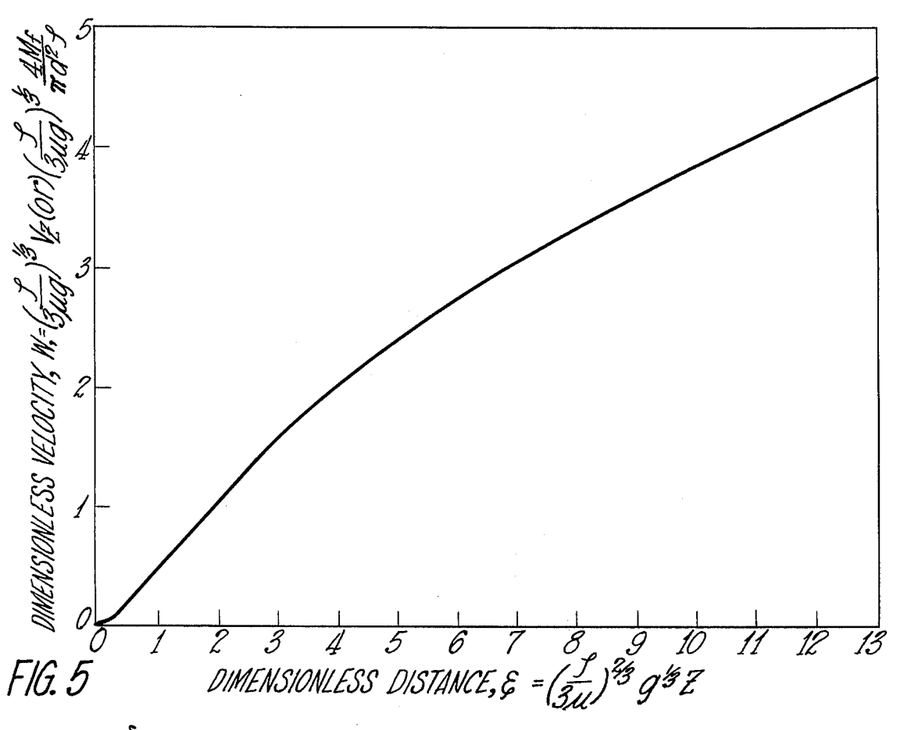
FIGS. 5 & 6 present a plot of the momentum equation's numerical solution.

A numerical solution to equation (16) was obtained by computer programing the Taylor Expansion method. For the initial step, $\xi$ is set equal to 60 and a trial value for W is selected. The numerical solution then proceeds from the initial value with backward steps. The iteration process adjusts the initial value of W until the solution passes through a window near $\xi = 0$ and W = 0. FIG. 4 presents the flow diagram of the computer program used for the numerical solution. FIG. 5 presents the numerical solution obtained by the computer program.

Since the stream diameter $d$ is the measurable dependent variable, and not $V_z$, the numerical solution of FIG. 5 is considered to define the relationship between the diameter $d$ and the axial distance $z$ with $\rho$, $\mu$, and $m_f$ as parameters. Mass flow rate $m_f$ is the desired unknown quantity. Therefore, if the diameter of the stream can be measured at a known $z$, the mass flow rate can be obtained directly from FIG. 5. Unfortunately, the $z$ of FIG. 5 is not measured from any physically indentifiable point on the glass stream axis, rather, it is measured from where $d$ is infinite (or $V_z$ zero).

For a given $\rho$, $\mu$, $g$, the numerical solution presented in FIG. 5 gives $V_z = f(z)$. This requires the velocity to be independent of mass flow rate. But in the actual case, the velocity at a given distance from the tip is determined by the initial velocity of the stream from the tip plus free fall acceleration. As the mass flow rate varies the initial velocity will correspondingly vary, causing the velocity at the given location to vary. Thus, for the actual case the $z=0$ point floats because of mass flow rate variation thereby making it impossible to determine mass flow rate using a single diameter measurement.

The uncertainty of the $z=0$ location may be eliminated by measuring two streams diameters at a known distance apart $\Delta z$. Thus, in view of the numerical solution presented in FIG. 5 we have two equations and two unknowns:

$$M_f = F(z, d_1, \rho, \mu, g) \tag{18}$$

$$M_f = F(z+\Delta z, d_2, \rho, \mu, g) \tag{19}$$

If $\rho$, $\mu$, and $g$ are known quantities and $z$ is eliminated from equations (18) and (19) we have, $$M_f = F(\Delta z, d_1, d_2, \rho, \mu, g) \tag{20}$$

Approximation To The Numerical Solution

Figure 6:
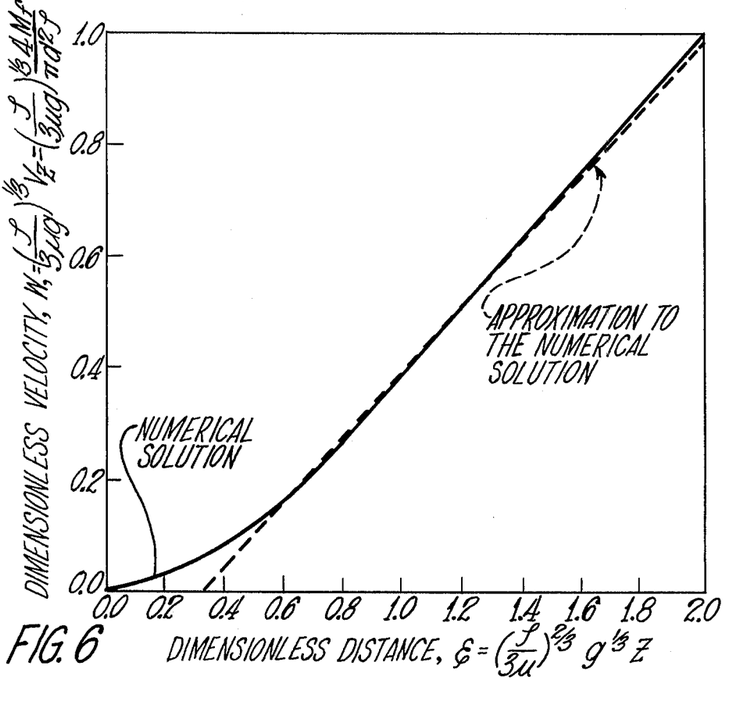

Close examination of FIG. 6 shows that for $0.2 \leq W \leq 0.6$ a straight line reasonably approximates the numerical solution. Therefore, $$W = S_1 \xi + b \quad (21)$$

where $S_1$ is the slope of the linear approximation. This value found by the method of least squares is 0.57. Substituting for W and $\xi$ and rearranging terms, $$M_f = C_1 d^2 \mu^{-\frac{1}{2}} Z - C_2 \mu^{\frac{1}{2}} d^2 \quad (22)$$

Where, $$C_1 = \frac{\pi \rho}{4} \left(\frac{3g}{\rho}\right)^{\frac{1}{2}} \left(\frac{\rho}{3}\right)^{\frac{1}{2}} g^{\frac{1}{2}} S_1 \quad (22a)$$

If a diameter at an appropriate location on the glass stream axis is designated as $d = d_o$ at $z = z_o$, and the diameter at any distance $\Delta z$ downstream of $z = z_o$ is set at $d$, equation (22) produces two equations $$M_f = C_1 d_o^2 \mu^{-\frac{1}{2}} Z_o - C_2 \mu^{\frac{1}{2}} d_o^2 \quad (23)$$

$$M_f = C_1 d^2 \mu^{-\frac{1}{2}}(Z_o + \Delta Z) - C_2 \mu^{\frac{1}{2}} d^2 \quad (24)$$

Eliminating $z_o$ from equations (23) and (24) yields, $$M_f = \frac{C_1 d^2 d_0^2 \mu^{-\frac{1}{2}} \Delta Z}{d_0^2 - d^2}; \quad (25)$$

It is necessary to insure that the diameters measured on the glass stream are taken only at those locations on the glass stream axis within the domain of the linear approximation. This domain can be defined in two ways. First, using the range $0.2 \leq W \leq 0.6$ and substituting for the value of W from equation (17)

$$0.2 \leq \left(\frac{\rho}{3\mu g}\right)^{\frac{1}{2}} \frac{4 M_f}{\pi d^2 \rho} \leq 0.6 \quad 26$$

The second specification of the domain may be found from the values of $\xi$ that correspond to $0.2 \leq W \leq 0.6$, namely $0.65 \leq \xi \leq 1.4$. Substituting the expression for $\xi$ from equation (14).

$$0.65 \leq \left(\frac{\rho}{3\mu}\right)^{\frac{1}{2}} g^{\frac{1}{2}} Z \leq 1.4 \quad 27$$

As has been shown, z is not a measurable variable. But the difference of the maximum and minimum values of z, given by equation (27), is measurable and useful. This maximum span, $(\Delta z)_{max}$ is then $$(\Delta Z)_{max} = 0.75 \left(\frac{3\mu}{\rho}\right)^{\frac{1}{2}} g^{-\frac{1}{2}} \quad (28)$$

Experimental Verification Of The Model

The assumptions implicit in development of the model is that the molten glass stream is sufficiently is thermal within a given axial region that the model described by equation (16) is applicable. It is further assumed that a region can be found on the z axis where the straight line approximation to the numerical solution of equation (16) is possible.

Rearranging equation (25) into a straight line form we obtain, $$\frac{1}{d^2} = \frac{C_1}{M_f \mu^{\frac{1}{2}}} \Delta Z + \frac{1}{d_0^2} \quad (29)$$

Therefore, if the assumptions are reasonable, a plot of $1/d^2$ vs. $\Delta z$ should be a straight line, and the slope of that line, $s$, should be related to the mass flow rate:

$$S = \frac{C_1}{M_f \mu^{\frac{1}{2}}} \quad (30)$$

Applying equations (26) and (22) to the process of FIG. 1 a molten glass density of 2.48 g/cc was assumed representative of the glass used in the manufacture of glass insulating wool. Further, a representative mass flow rate range of 125 g/sec to 170 g/sec and a molten glass viscosity of 600 poise (representative of molten glass at approximately 2000° F) was assumed. By substituting the representative values for molten glass, equation (26) indicates that the values of $d$ within the linear approximation domain must lie between 1.09 and 1.28 cm. Solution of equation (27) further indicates that the span along the z axis for this diameter range is approximately six cm.

Figure 7:
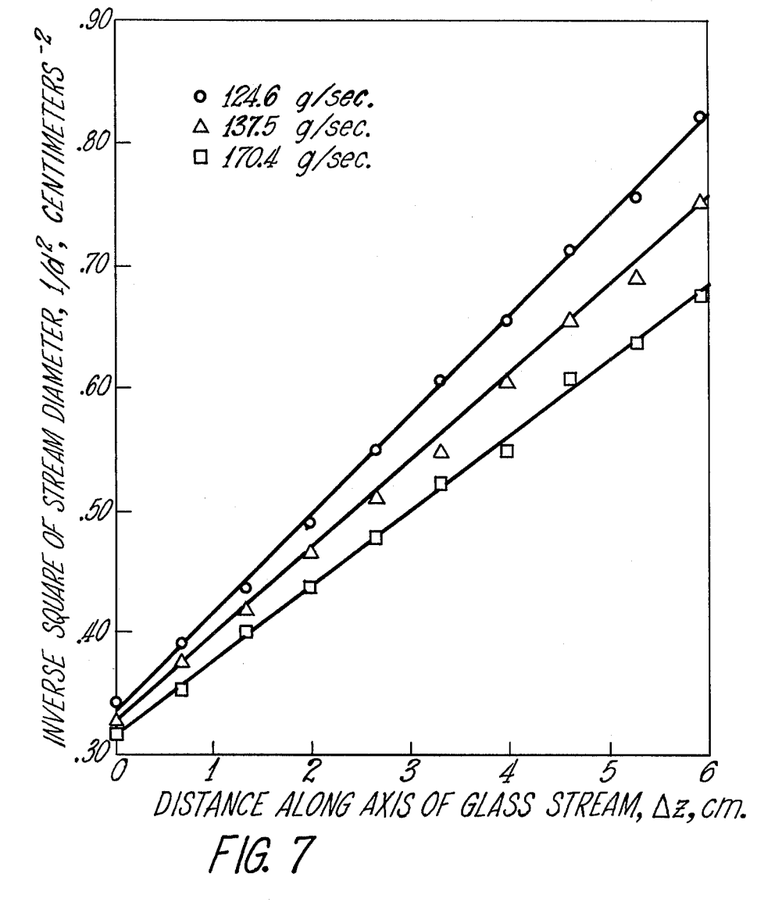
FIG. 7 presents a plot of experimental data used to check the validity of the mathematical model.

Photographs were taken of typical molten glass streams, item 16 of FIG. 1, and measurements of the stream diameter $d$ taken over a $\Delta z$ of 6 cm. beginning approximately 4 cm. from the bushing tip. Excellent confirmation of equation (29) was obtained as shown in FIG. 7. Application Of The Model To Glass Fiber Production The mass flow rate of the model is calculated from equation (25). The values of density $\rho$ and viscosity $\mu$ for the molten glass stream 16, of FIG. 1, are assumed to be those of the molten glass 13 immediately upstream of bushing 15 which may easily be determined by thermocouple measurement.

The calculated mass flow rate of the model is assumed to be related to the actual mass flow rate by a calibration coefficient K:

$$(M_f)_{actual} = K(M_f)_{model} \quad (31)$$

The coefficient K is empirically determined, for a given glass composition, by running sufficient experiments at different mass flow rates to generate a plot of $(m_f)_{actual}$ vs. $(m_f)_{model}$. The slope of the straight line approximating that data represents the calibration coefficient K for equation (31).

At the time the calibration constant K is determined the molten glass will have a nominal composition and temperature. At some later time, the glass composition may be off nominal, or the temperature may have changed. The calibration constant K will necessarily be different. It is not necessary, however, to repeat the lengthy initial calibration procedure. The initial calibration procedure was used to confirm a reasonable correlation between $(m_f)_{model}$ and $(m_f)_{actual}$ as much as finding the value of K. Therefore, subsequent changes in the value of K can be made simply by periodically comparing the manual "catch bucket" value with the calculated $(m_f)_{actual}$ value. If these values are significantly different, a new K may be determined by multiplying the old K by the ratio of the measured mass flow to the model's calculated value. This procedure will periodically update the calibration constant. If massive process changes are made, such as using a completely different glass composition, $\mu$ must be re-calculated from the measured upstream temperature with the viscosity-temperature curve appropriate for the new glass. Furconstant. If massive process changes are made, such as using a completely different glass composition, $\mu$ must be re-calculated from the measured upstream temperature with the viscosity-temperature curve appropriate for the new glass. Further, if the glass density changes, the constant $C_1$ must accordingly be corrected.

But the extensive initial calibration procedure would only be necessary to confirm that the scatter of ($m_f$) actual vs. ($m_f$) model is still acceptable. This need only be done if control problems arise suggesting re-confirmation of the original calibration.

Figure 8:
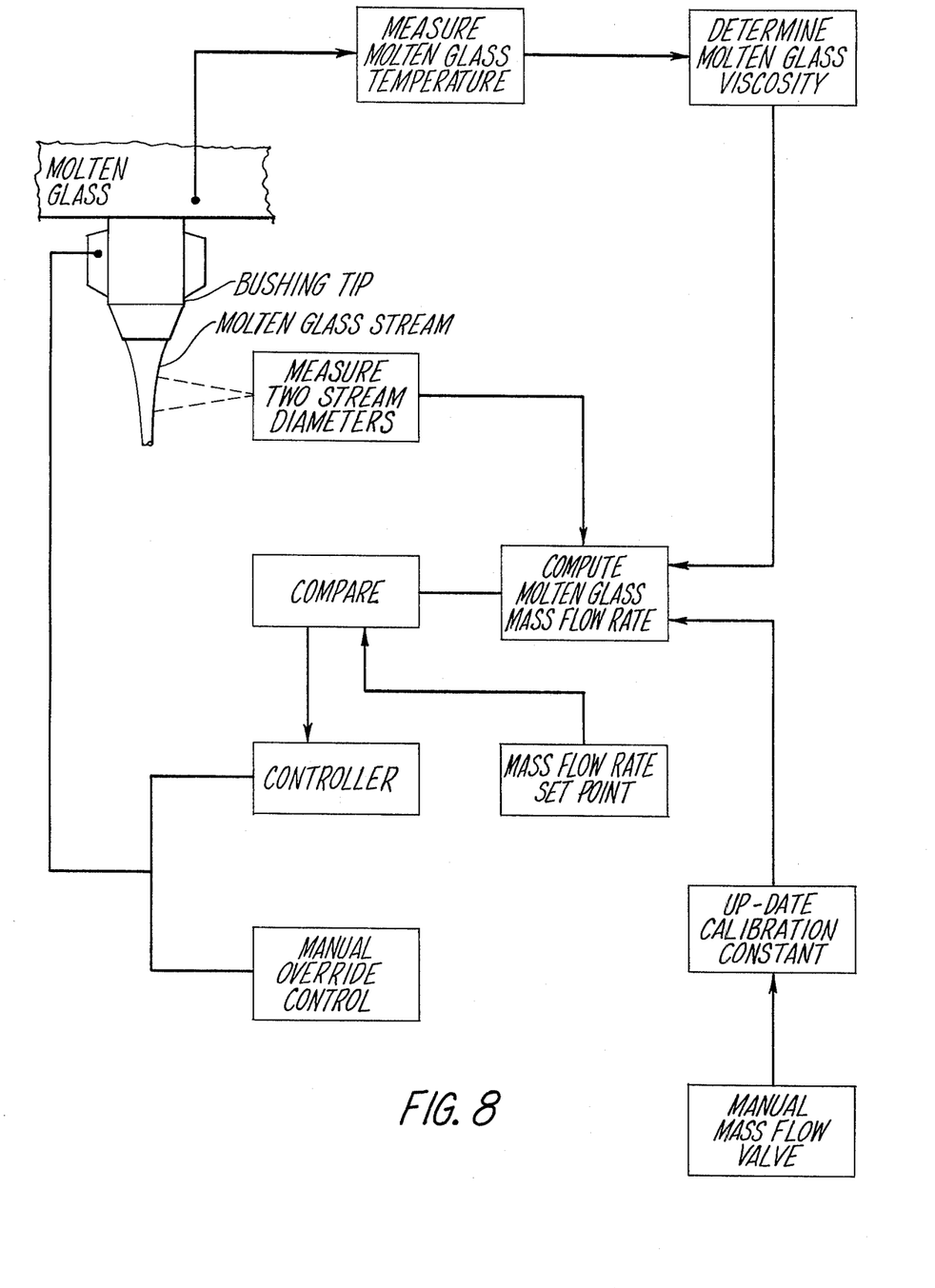
FIG. 8 shows a typical closed loop control program embodying my invention.

FIG. 8 schematically presents an automatic control loop for controlling the bushing through put embodying my method of estimating the mass flow rate of a free-falling stream of glass. Molten glass is supplied to the bushing tip by an overhead forehearth wherein the forehearth glass temperature is measured by an immersed thermocouple or any other suitable temperature measuring device. Using the forehearth temperature the viscosity of the molten glass is determined. Two stream diameter measurements are taken at a stream location defined by equations (26), (27) and (28) thus assuring one dimensional flow.

The molten glass mass flow rate is then calculated using equations (25) and (31). The actual mass flow rate is then compared with the mass flow rate set point value and a correction signal dispatched to the bushing control.

If the actual mass flow rate is less than the set point value, the resistance heating of the bushing is increased thereby lowering the viscosity of the thin layer of molten glass immediately adjacent the inside wall of the bushing. The fluid dynamic friction is correspondingly reduced causing an increase in mass flow rate through the bushing tip. Similarly, if the actual mass flow rate is greater than the bushing set point value, the resistance heating of the bushing is reduced causing an increase of fluid dynamic friction accompanied by a corresponding lower mass flow rate.

A number of stream diameter measuring devices suitable for obtaining the required stream diameters are available. However, for the measurement of a molten glass stream preferable to use a line scan camera employing a linear array of pen photodiodes sensitive to the emissions within the photo spectrum when compared to a contrasting background.

Obviously many modifications and variations of the presented invention are possible in light of the above teachings. It is therefore to be understood that within the scope of the appended claims the invention may be practiced otherwise than a specifically described.

I claim:

1. Apparatus for controlling the mass flow rate of a stream of molten glass having a substantially circular cross-section comprising:
   (a) means for measuring the viscosity of said molten glass;
   (b) means for measuring the diameter of said stream at at least two axially-spaced loci on said stream;
   (c) means for determining the mass flow rate of said stream from the measured viscosity and the measured diameters; and,
   (d) means for adjusting the mass flow rate of said streams responsive to the determined mass flow rate.

2. The apparatus of claim 1 in which said means for determining the mass flow rate is adapted to generate a signal responsive thereto and further comprising:
   (e) means for comparing said signal with a reference signal; and,
   (f) means for controlling said means for adjusting responsive to the comparison of the signals.

3. The apparatus of claim 2 in which said means for adjusting comprises means for heating said molten glass.

4. The apparatus of claim 3 in which said means for heating comprises a heated orifice through which said stream flows.

5. The apparatus of claim 4 in which said means for measuring viscosity comprises thermocouple means.

6. The apparatus of claim 5 in which said heated orifice is substantially circular and in which said means for measuring diameters is adapted to measure diameters at loci which are spaced apart from said heated orifice by a distance of about two diameters of said orifice.

7. The apparatus of claim 6 in which said means for measuring diameters comprises a line scan camera with an array of photodiodes.

8. The method of controlling the mass flow rate of a stream of molten glass having a substantially circular cross-section comprising:
   (a) measuring the viscosity of said molten glass;
   (b) measuring the diameter of said stream at at least two axially-spaced loci on said stream;
   (c) determining the mass flow rate of said stream from the measured viscosity and the measured diameters; and,
   (d) adjusting the mass flow rate of said stream responsive to the determined mass flow rate.

9. The method of claim 8 comprising generating a signal responsive to said mass flow rate, comparing said signal with a reference signal and adjusting of the mass flow rate responsive to the comparison of the signals.

10. The method of claim 9 in which adjusting the mass flow rate comprises adjusting the temperature of a means for heating said molten glass.

11. The method of claim 10 comprising flowing said stream through said means for heating which comprises a heated orifice.

12. The method of claim 11 in which measuring the viscosity of said molten glass comprises measuring the temperature of said molten glass.

13. The method of claim 12 in which said heated orifice is substantially circular and in which step (b) comprises measuring diameters at loci which are spaced apart from said heated orifice by a distance of about two diameters of said orifice.

14. The method of claim 13 in which step (b) comprises viewing said stream with a line scan camera adapted with an array of photodiodes.

15. The method of claim 14 in which step (c) comprises computing the mass flow rate of said stream from the relationship $$M_f = k \frac{g^{2/3} \rho^{4/3} d^2 d_o^2 \mu^{-1/3} \Delta z}{(d_o^2 - d^2)}$$

wherein
  $M_f$ is the molten glass flow rate,
  $\mu$ is the molten glass viscosity,
  $d_o$ is an upper stream diameter,
  $d$ is a lower stream diameter,
  $\Delta z$ is the axial distance between the loci of $d$ and $d_o$,
  $g$ is the acceleration of gravity,
  $\rho$ is the molten glass density, and
  $k$ is a calibration coefficient.

* * * * *